US009642088B2

(12) United States Patent
Atias et al.

(10) Patent No.: US 9,642,088 B2
(45) Date of Patent: *May 2, 2017

(54) POWER MANAGEMENT IN DISTRIBUTED ANTENNA SYSTEMS (DASS), AND RELATED COMPONENTS, SYSTEMS, AND METHODS

(71) Applicant: Corning Optical Communications Wireless Ltd, Airport (IL)

(72) Inventors: Nissim Atias, Ra'anana (IL); Isaac Shapira, Petach Tikva (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,449

(22) Filed: Oct. 14, 2016

(65) Prior Publication Data

US 2017/0034784 A1    Feb. 2, 2017

Related U.S. Application Data

(63) Continuation of application No. 13/771,756, filed on Feb. 20, 2013, now Pat. No. 9,497,706.

(51) Int. Cl.
*H04W 52/02* (2009.01)

(52) U.S. Cl.
CPC ... *H04W 52/0254* (2013.01); *H04W 52/0206* (2013.01); *H04W 52/0251* (2013.01)

(58) Field of Classification Search
None
See application file for complete search history.

(56) References Cited

U.S. PATENT DOCUMENTS

| | | | |
|---|---|---|---|
| 2009/0280854 | A1 | 11/2009 | Khan et al. |
| 2010/0056184 | A1 | 3/2010 | Vakil et al. |
| 2012/0122405 | A1 | 5/2012 | Gerber et al. |

(Continued)

FOREIGN PATENT DOCUMENTS

| | | | |
|---|---|---|---|
| EP | 2056628 A1 | 5/2009 | |
| WO | 2011138346 A1 | 11/2011 | |
| WO | 2012103822 A2 | 9/2012 | |

OTHER PUBLICATIONS

Patent Cooperation Treaty, International Preliminary Report on Patentability for application No. PCT/IL14/050159, dated Aug. 25, 2015, 4 pages.

(Continued)

*Primary Examiner* — Edan Orgad
*Assistant Examiner* — Sithu Ko
(74) *Attorney, Agent, or Firm* — C. Keith Montgomery

(57) ABSTRACT

Power management in a distributed communications system, such as a distributed antenna system (DAS), that includes determining user activity at remote units of the DAS. When user activity in one or more remote units falls below or above a specified threshold, power usage by the one or more remote units is reduced or increased accordingly. The power usage may reduced and/or increased by turning select remote units on or off, by increasing or reducing an operating voltage of one or more power amplifiers, and/or by turning select multiple-in, multiple-out (MIMO) front ends on or off. Power may be reduced such that wireless coverage within a specified area is maintained.

17 Claims, 9 Drawing Sheets

(56) References Cited

U.S. PATENT DOCUMENTS

| | | | |
|---|---|---|---|
| 2013/0035047 A1 | 2/2013 | Chen et al. | |
| 2013/0040676 A1* | 2/2013 | Kang | H04B 7/0495 |
| | | | 455/509 |
| 2013/0094425 A1* | 4/2013 | Soriaga | H04W 88/085 |
| | | | 370/312 |
| 2013/0235726 A1* | 9/2013 | Frederiksen | H04W 36/22 |
| | | | 370/235 |

OTHER PUBLICATIONS

Patent Cooperation Treaty, International Search Report for PCT/IL14/050159, dated Aug. 28, 2014, 3 pages.

* cited by examiner ered on remote units 14 connected to a head-end equipment 16 (e.g., a head-end controller, a head-end unit, or a central unit). The remote units 14 receive wireless communications services from the head-end equipment 16 over a communications medium 18 to be distributed in a respective coverage area 10. The remote units 14 include information processing electronics, an RF transmitter/receiver, and an antenna 20 operably connected to the RF transmitter/receiver to wirelessly distribute the wireless communications services to wireless client devices 22 within the coverage area 10. The size of a given coverage area 10 is determined by the amount of RF power transmitted by the remote unit 14, receiver sensitivity, antenna gain, and RF environment, as well as by the RF transmitter/receiver sensitivity of the wireless client device 22. Wireless client devices 22 usually have a fixed RF receiver sensitivity, so that the properties of the remote unit 14 mainly determine the size of the coverage area 10.

In wireless/cellular networks, such as the DAS 12 in FIG. 1, high power equipment used for distributing signals over long distances consumes significant energy. Each remote unit 14 includes an electronic unit that consumes energy for operation in receiving and transmitting wireless communications signals. For example, in some conventional DASs, remote units 14 can consume about fifteen watts (15 W) for each wireless service provided. In some conventional DASs, three or more services may be provided simultaneously, resulting in power consumption of forty-five watts (45 W) or more for each remote unit 14. Many conventional DASs include more than fifty (50) remote units 14, with some systems including one hundred (100) remote units 14 or more. Thus, total power consumption in these systems can exceed 1.5 or 3 kilowatts (kW).

High power consumption in the remote units 14 also generates heat that may require dissipation to avoid damaging components in the remote units 14, and to avoid interfering with the climate control preferences in the environment of the distributed antenna system 12 (e.g., enclosed in a building). This excess heat is typically dissipated by a building's air-conditioning system, which increases operating costs. In addition, conventional DASs 12 are usually operated at all times in order to maintain coverage throughout the building, including hours and/or days during which there is little activity in the coverage areas 10. Thus, the high power consumption experienced by these conventional DASs 12 is continuous, which further adds to operating costs.

SUMMARY OF THE DETAILED DESCRIPTION

Embodiments disclosed in the detailed description include methods, apparatuses, and systems for power management in a distributed antenna system (DAS), such as a distributed communications system, and related components, systems and methods. Embodiments include determining user activity at remote units of the DAS. In some embodiments, when user activity in one or more remote units falls below a specified threshold, power usage by the one or more remote units is reduced. In this manner, as a non-limiting example, during periods of low user activity, users within a coverage area may receive continuous coverage without added expense and energy usage required by running the DAS at full power. In some embodiments, when user activity in one or more remote units rises above a specified threshold, power usage by the remote units is increased. Power usage may be reduced and/or increased by turning select remote units on or off, by increasing or reducing an operating voltage of one or more power amplifiers, and/or by turning select multiple-in, multiple-out (MIMO) front ends on or off. Power may be reduced to maintain wireless coverage within a specified area.

In this regard, in one embodiment, a method comprises determining that at least one remote unit of the DAS is experiencing user activity below a first predetermined threshold. The method further comprises, in response to the determination that the at least one remote unit is experiencing user activity below the first predetermined threshold, causing power usage by the at least one remote unit to be reduced. In this manner, as a non-limiting example, users may receive continuous coverage while the DAS is able to operate at reduced power during periods of low user activity.

In another embodiment, a controller is configured to be connected to at least one of a head-end unit or a first remote unit of a plurality of remote units of a DAS. The controller further determines that at least one remote unit of the plurality of remote units is experiencing user activity below a first predetermined threshold. The controller is further configured to, in response to the determination, reduce power usage by the at least one remote unit.

In another embodiment, a non-transitory computer-readable medium having instructions for directing a processor performs a method comprising determining that at least one remote unit of a DAS is experiencing user activity below a first predetermined threshold. The method further comprises reducing power usage in the remote unit in response to the determination.

DETAILED DESCRIPTION

Embodiments disclosed in the detailed description include methods, apparatuses, and systems for power management in a distributed antenna system (DAS), such as a distributed communications system, and related components, systems and methods. Embodiments include determining user activity at remote units of the DAS. When user activity in one or more remote units falls below a specified threshold, power usage by the one or more remote units is reduced. In this manner, during periods of low user activity, users within a coverage area may receive continuous coverage without added expense and energy usage required by running the DAS at full power. In some embodiments, when user activity in one or more remote units rises above a specified threshold, power usage by the one or more remote units is increased. Power usage may be reduced and/or increased by turning select remote units on or off, by increasing or reducing an operating voltage of one or more power amplifiers, and/or by turning select multiple-in, multiple-out (MIMO) front ends on or off. Power may be reduced such that wireless coverage within a specified area is maintained. In this regard, a method of managing power in a DAS comprises determining that a remote unit of the DAS is experiencing user activity below a first predetermined threshold. In response to the determination, power usage by the remote unit is reduced.

Reference will now be made in detail to the embodiments, examples of which are illustrated in the accompanying drawings, in which some, but not all embodiments are shown. Whenever possible, like reference numbers will be used to refer to like components or parts.

Figure 1:
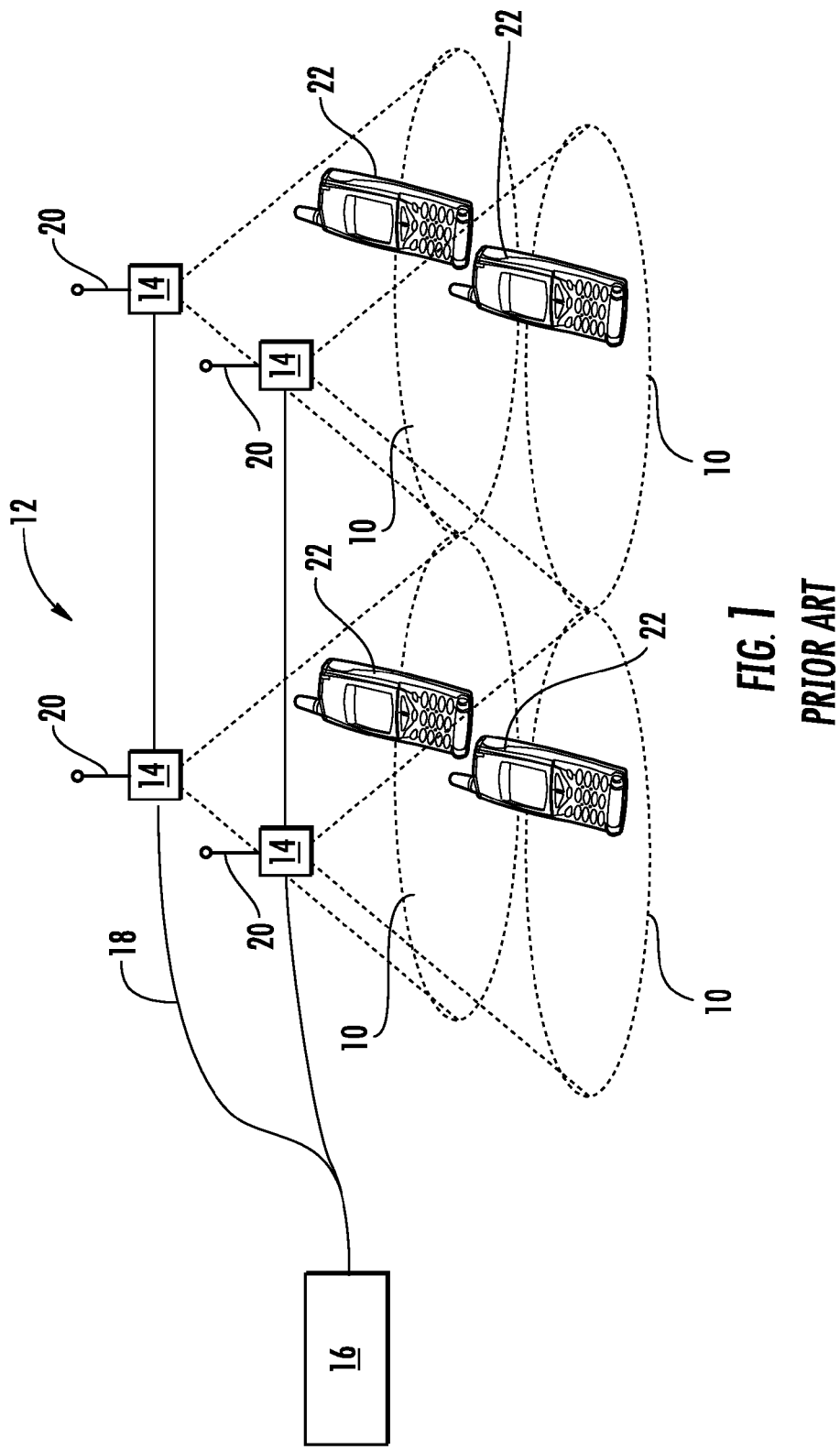
FIG. 1 is a schematic diagram of a conventional distributed antenna system (DAS) capable of distributing wireless communications services to client devices.
Figure 2:
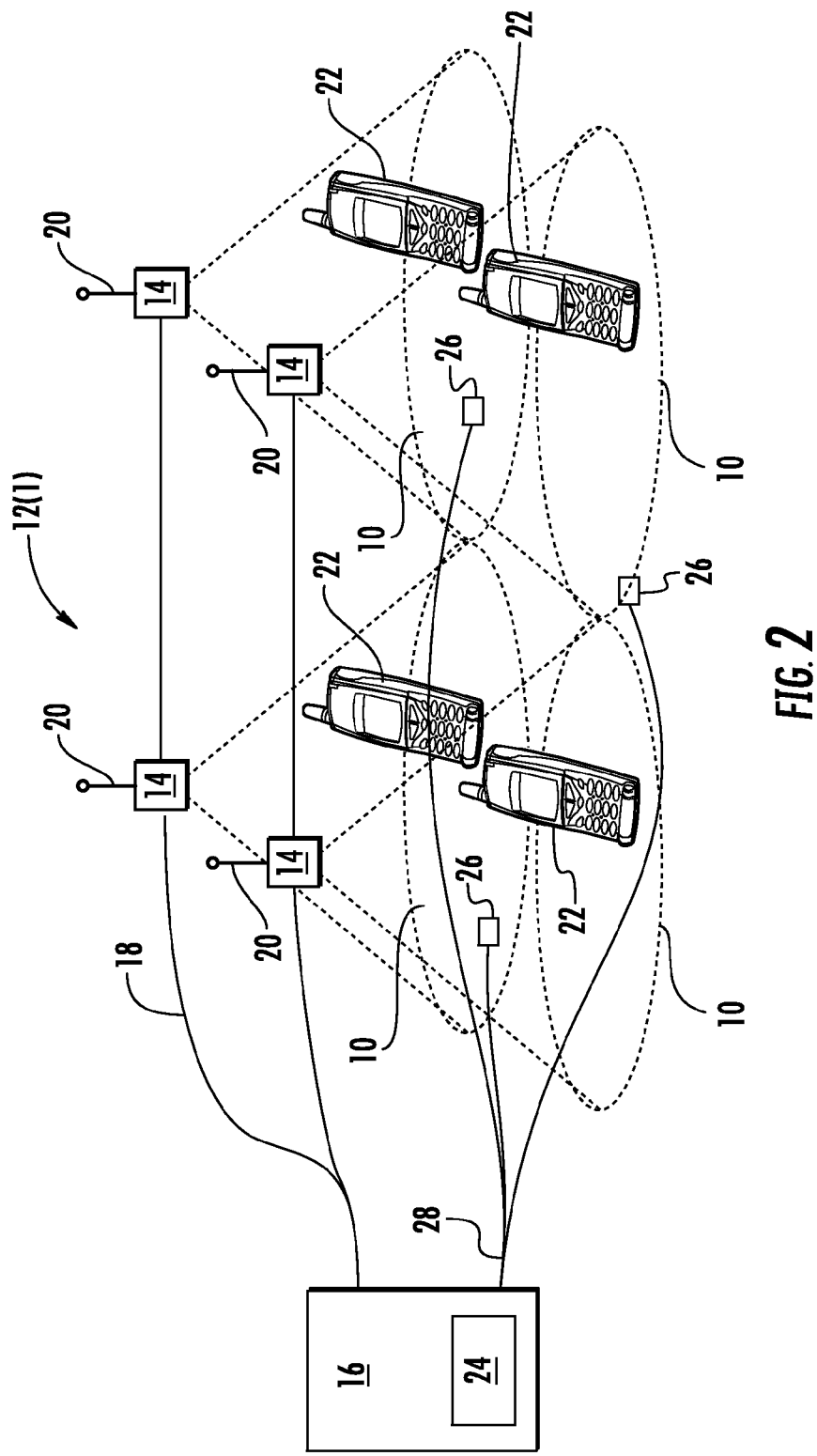
FIG. 2 is a schematic diagram of an exemplary DAS capable of distributing wireless communications services to client devices and managing power usage based on determined user activity.

FIG. 2 is a schematic diagram of an exemplary DAS 12(1) capable of distributing wireless communications services to wireless client devices 22. The DAS 12(1) could be referred to as a distributed communications system in some embodiments. In FIG. 2, coverage areas 10 in the DAS 12(1) are created by and centered on remote units 14 connected to a head-end equipment 16 (e.g., a head-end controller or head-end unit), similar to the conventional DAS 12 illustrated by FIG. 1. The remote units 14 receive wireless communications services from the head-end equipment 16 over a communications medium 18 to be distributed in their respective coverage areas 10. In this embodiment, the DAS 12(1) is designed such that the coverage areas 10 overlap with one another. This arrangement permits redundancy in coverage and ensures that the entirety of a building or other installation is included in the total coverage area 10 of the DAS 12(1).

The remote units 14 include information processing electronics, an RF transmitter/receiver, and an antenna 20 operably connected to the RF transmitter/receiver to wirelessly distribute the wireless communications services to the wireless client devices 22 within the coverage area 10. The size of a given coverage area 10 is determined by the amount of RF power transmitted by the remote units 14, receiver sensitivity, antenna gain, and RF environment, as well as by the RF transmitter/receiver sensitivity of the wireless client devices 22. All of these components consume power during operation of the remote unit 14. Because conventional DASs 12 are usually operated constantly and at full power, including hours and/or days during which there is low or no activity in the coverage areas 10, the power consumption experienced by these conventional DASs 12 can be extremely high, and can waste a significant amount of energy and money, particularly during periods of low user activity. To address this issue, an energy management module 24 is coupled to the head-end equipment 16 in FIG. 2. The energy management module 24 communicates with the head-end equipment 16 and/or remote units 14 using the communications medium 18 to manage power consumption by the elements of the DAS 12(1). As will be described in greater detail with respect to FIGS. 3A-3C, the energy management module 24 is configured to selectively reduce power to one or more of the remote units 14 in response to determining that user activity has fallen below a certain threshold. In this embodiment, the energy management module 24 is also connected to and communicates with a plurality of activity sensors 26 by another communications medium 28 distributed throughout area covered by the coverage areas 10. The wireless client devices 22 usually have a fixed RF receiver sensitivity, so that the above-mentioned properties of the remote units 14 mainly determine the size of the coverage area 10. In this embodiment, the energy management module 24 is an integrated component of the head-end equipment 16, but in other embodiments, the energy management module 24 can be a separate component from the head-end equipment 16. A plurality of energy management modules 24 can also be integrated into or be otherwise connected to individual remote units 14 as well.

In this embodiment, the activity sensors 26 are distributed separately from the remote units 14 of the DAS 12(1). These activity sensors 26 can be used to determine whether a number of users is below a certain threshold, which can in turn be used to determine whether the DAS 12(1) is being under-utilized. In other embodiments, the activity sensors 26 can also be integrated into or be otherwise connected to individual remote units 14 as well. In addition, the activity sensors 26 can employ the same communications medium 28 as the remote units 14 in these embodiments. Examples of activity sensors 26 include infrared motion sensors, door activity sensors, and other sensors for detecting whether users are present within the coverage areas 10.

The energy management module 24 determines whether one or more of the remote units 14 of the DAS 12(1) is being under-utilized, i.e., experiencing user activity below a certain threshold. This determination can be made based on received signals from the activity sensors 26, an analysis of a downlink signal delivered to the remote units 14 from the head-end equipment 16, an analysis of received signal strength (RSSI) at one or more of the remote units 14, determining a number of active users utilizing a network associated with the coverage areas 10, such as a computer network or a combination of networks.

Figure 3A:
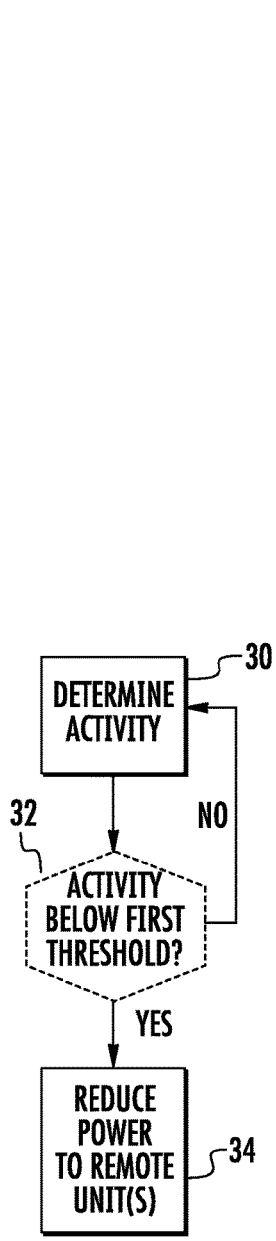
FIG. 3A illustrates an exemplary workflow for managing power usage of a DAS based on determined user activity according to one embodiment.

FIG. 3A illustrates an exemplary workflow for managing power usage of DAS 12(1). It should be understood that this and subsequent workflows, and variations thereof, may also be used with other embodiments disclosed and contemplated herein. At the start of the workflow of FIG. 3A, an activity level at one or more remote units 14 is determined (block 30), for example, at a power management module 24 of a DAS 12(1). The determining can be performed continuously, at predetermined times or time intervals, or in response to detected conditions, such as a received input from an activity sensor 26. Next, it is determined whether the determined activity level is below a first threshold (block 32). If the activity level is not below the first threshold, the process returns to determining the activity level (block 30). If the activity level is below the first threshold, power is reduced to one or more selected remote units 14 (block 34).

Figure 3B:
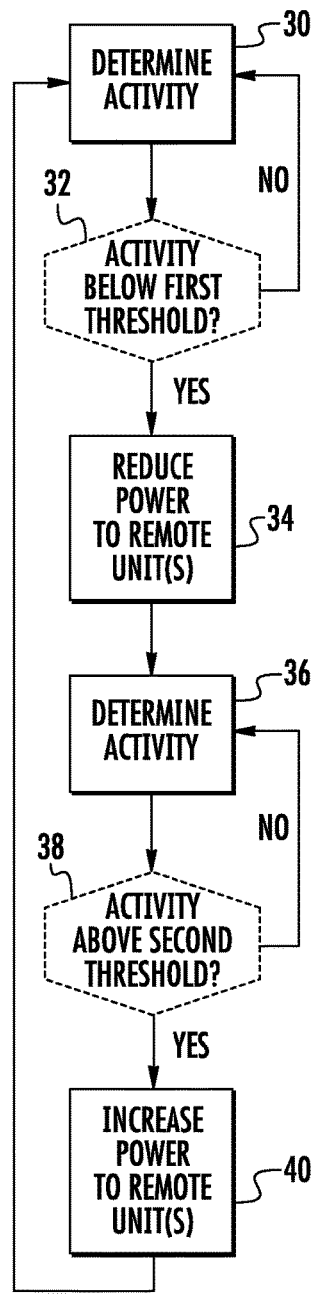
FIG. 3B illustrates an exemplary workflow for managing power usage of a DAS based on determined user activity according to another embodiment.

FIG. 3B illustrates a more detailed workflow for managing power usage in a distributed antenna system 12(1) according to another embodiment. As in the workflow of FIG. 3A, an activity level of one or more remote units 14 is determined (block 30), and it is further determined whether the determined activity level is below a first threshold (block 32). Likewise, if the activity level is not below the first threshold, the process returns to determining the activity level (block 30); if the activity level is below the first threshold, power is reduced to one or more selected remote units 14 (block 34).

In the workflow of FIG. 3B, after power is reduced (block 34), activity at the one or more remote units 14 is again determined (block 36), for example, in a manner similar to block 30. Next, it is determined whether the determined activity level is above a second threshold (block 38). The second threshold can be equal to the first threshold, or can be higher than the first threshold in order to prevent continuously changing the power level of the remote units 14. If the activity level is not above the second threshold, the process returns to determining the activity level (block 36). If the activity level is above the second threshold, power is increased to the one or more selected remote units 14 (block 40). Next, the process returns to the original determination activity (block 30), and the process repeats.

Figure 3C:
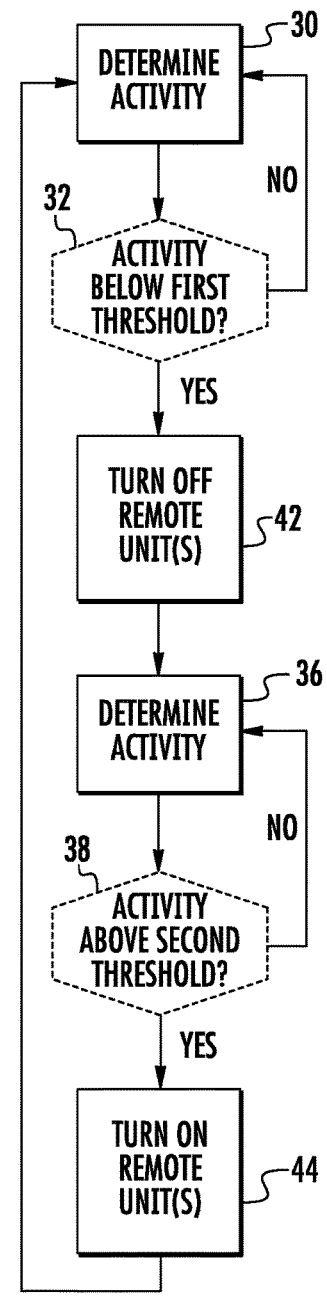
FIG. 3C illustrates an exemplary workflow for managing power usage of a DAS based on determined user activity according to another embodiment.

FIG. 3C illustrates an exemplary workflow for managing power usage of a DAS 12(1) according to another embodiment. In this embodiment, blocks 30, 32, 36, and 38 operate in the same manner as in FIG. 3B. However, in this embodiment, if the activity level is determined to be below the first threshold in block 32, one or more selected remote units 14 is completely shut off (block 42). Likewise, in the embodiment of FIG. 3B, if the activity level is determined to be above the second threshold in block 38, the one or more selected remote units 14 is turned back on (block 44).

If no signal is received above a certain power level at one or more of the remote units 14 for a given time period, the energy management module 24 may determine that there is no wireless activity under the coverage areas 10 of the respective remote units 14. Thus, power for these remote units 14 can be reduced or shut off. For some cellular technologies, low activity may be characterized by transmission of a lower number of radio carriers, or transmission of only low modulation scheme signals, which do not require high linearity and therefore can be operated in lower power levels. For some cellular technologies (e.g. WCDMA), the coverage area 10 of the remote units 14 is affected by the number of concurrent users. As will be described in greater detail with respect to FIGS. 6A-6C, the DAS 12(1) can be designed such that some remote units 14 can be shut off in low-usage situations without affecting the overall total coverage area 10.

In some cellular technologies, the downlink signal being transmitted from the head-end equipment 16 to the remote units 14 over the communications medium 28 may be analyzed to identify or otherwise determine an activity level of one or more remote units 14. For example, determining that only control data is being transmitted from the head-end equipment 16 may indicate that the DAS 12(1) is experiencing no user activity. Thus, in this situation, the power of one or more remote units 14 can be reduced or shut off. Low power operation can be pre-scheduled based on expected times of low activity. For example, if the DAS 12(1) is installed in an office building, the DAS 12(1) can be configured to operate in a reduced-power mode during nights, weekends, and holidays, i.e., when no users are expected to be present.

Once a determination is made that the DAS 12(1) is being under-utilized, the energy management module 24 reduces an amount of power that is utilized by one or more remote units 14. As will be discussed in greater detail with respect to FIG. 5, this reduction can be accomplished by reducing the power used by one or more power amplifiers associated with the head-end equipment 16 and/or the remote units 14, and can also be accomplished by shutting off one or more of the power amplifiers.

In this embodiment, the DAS 12(1) is further configured to determine that one or more remote units 14 is being utilized above a certain threshold, and power up and/or turn on one or more of the remote units 14 in response to the determination. The threshold can be the same threshold that triggers the powering down of the remote units 14, or can be a higher threshold than the first threshold to avoid continuously powering the remote units 14 on and off when user activity is maintained at or near the threshold over time.

Figure 4:
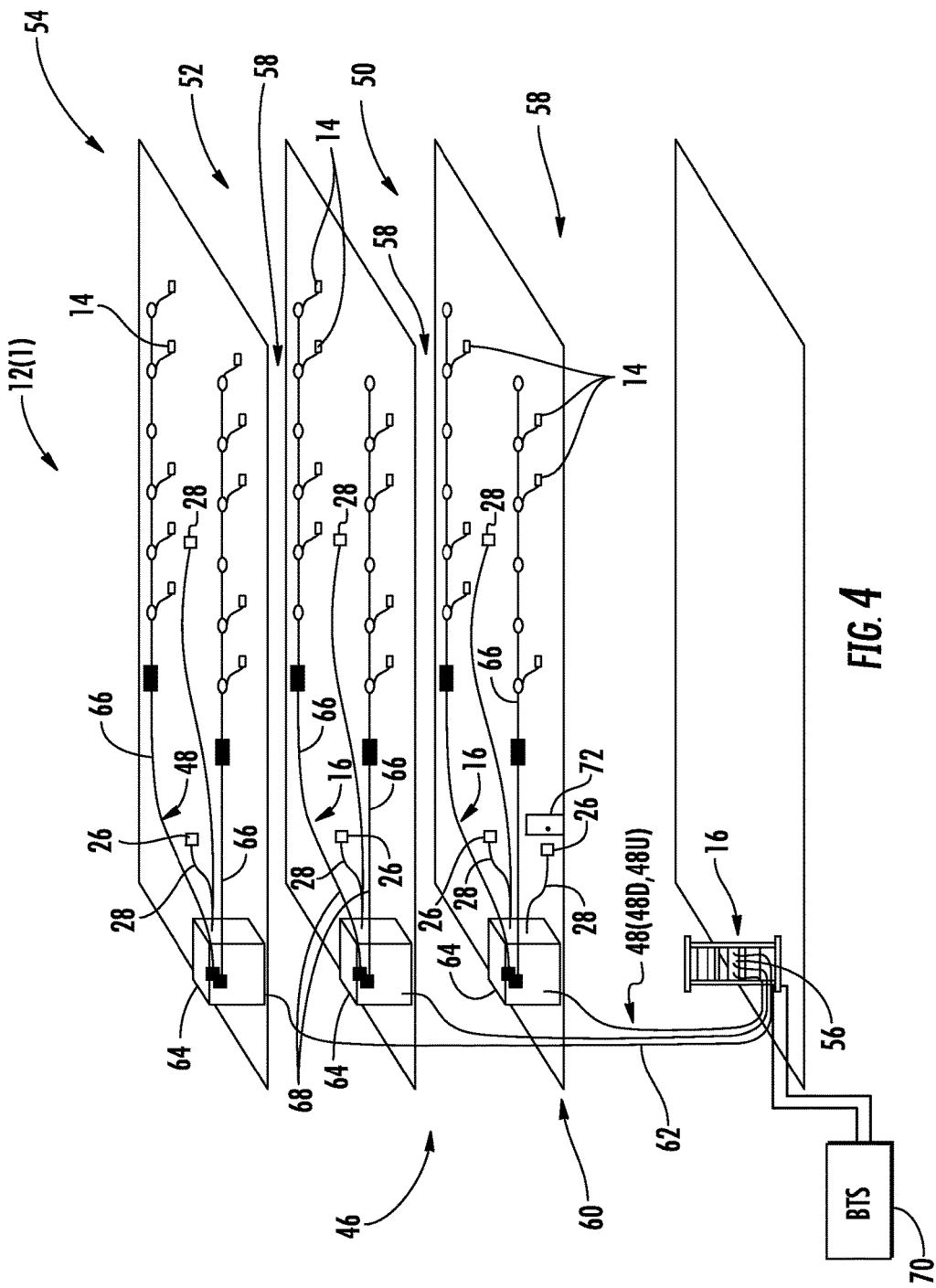
FIG. 4 is a partially schematic cut-away diagram of an exemplary building infrastructure in which the DAS in FIG. 2 can be employed.

FIG. 4 is a partially schematic cut-away diagram of an exemplary building infrastructure 46 in which the DAS 12(1) employing power management can be employed. In this regard, FIG. 4 provides an exemplary illustration of how the DAS 12(1) can be deployed indoors. The building infrastructure 46 generally represents any type of building in which the DAS 12(1) can be deployed. As discussed with regard to FIGS. 1 and 2, the DAS 12(1) incorporates the head-end equipment 16 to provide various types of communications services to coverage areas 10 within the building infrastructure 46. The DAS 12(1) is configured to receive wireless RF communications signals and convert the RF communications signals into Radio-over-Fiber (RoF) signals to be communicated over optical fibers 48 to multiple remote units 14. The DAS 12(1) can be, for example, an indoor distributed antenna system (IDAS) employed to provide wireless signals inside the infrastructure 46. Wireless signals can include cellular service, wireless services such as RFID tracking, WiFi, local area network (LAN), WLAN, and/or combinations thereof.

In this embodiment, the energy management module 24 included in the DAS 12(1) as shown in FIG. 2, is coupled to the head-end equipment 16, and communicates with the head-end equipment 16 and/or remote units 14 using a communications medium 28 to manage power consumption by the elements of the DAS 12(1). The energy management module 24 is also connected to and communicates with multiple activity sensors 26 through the communications medium 28 distributed throughout area covered by the coverage areas 10.

With continuing reference to FIG. 4, the building infrastructure 46 in this embodiment includes a first (ground) floor 50, a second floor 52, and a third floor 54. The floors 50, 52, 54 are serviced by the head-end equipment 16 through a main distribution frame 56 to provide antenna coverage areas 58 in the infrastructure 46. Only the ceilings of the floors 50, 52, 54 are shown in FIG. 4 for simplicity of illustration. In this exemplary embodiment, a main cable 60 has a number of different sections that facilitate the placement of a large number of remote units 14 in the building infrastructure 46. Each remote unit 14 in turn services its own coverage area 10 (not shown) in the antenna coverage areas 58. The main cable 60 can include, for example, a riser cable 62 that carries all of the downlink and uplink optical fibers 48D, 48U to and from the head-end equipment 16. The riser cable 62 may be routed through an interconnect unit (ICU) 64. The ICU 64 may include a power supply, or may be connected to a separate power supply (not shown). The ICU 64 may also be configured to provide power to the remote units 14 via an electrical power line provided inside an array cable 66, tail cable, or home-run tether cable as other examples, and distributed with the downlink and uplink optical fibers 48D, 48U to the remote units 14. The main cable 60 can include one or more multi-cable (MC) connectors adapted to connect select downlink and uplink optical fibers 48D, 48U, along with the electrical power line, to a number of optical fiber cables 68.

The main cable 60 enables the multiple optical fiber cables 68 to be distributed throughout the building infrastructure 46 (e.g., fixed to the ceilings or other support surfaces of each floor 50, 52, 54) to provide the antenna coverage areas 58 for the first, second, and third floors 50, 52, and 54. In this embodiment, the head-end equipment 16 is located within the infrastructure 46 (e.g., in a closet or control room), while in another embodiment, the head-end equipment 16 may be located outside of the building infrastructure 46 at a remote location. A base transceiver station (BTS) 70, which may be provided by a second party such as a cellular service provider, is connected to the head-end equipment 16, and can be co-located or located remotely from the head-end equipment 16. A BTS 70 is any station or source that provides an input signal to the head-end equipment 16 and can receive a return signal from the head-end equipment 16. In a typical cellular system, for example, a plurality of BTSs 70 is deployed at a plurality of remote locations to provide wireless telephone coverage. Each BTS 70 serves a corresponding cell, and when a wireless client device 22 enters the cell, the BTS 70 communicates with the wireless client device 22. Each BTS 70 can include at least one radio transceiver for enabling communications with one or more subscriber units operating within the associated cell. As another example, wireless repeaters or bi-directional amplifiers could also be used to serve a corresponding cell in lieu of a BTS 70. Alternatively, radio input could be provided by a repeater or picocell.

The adapted DAS 12(1) in FIGS. 2-4 provides point-to-point communications between the head-end equipment 16 and the remote units 14. Each remote unit 14 communicates with the head-end equipment 16 over a distinct downlink and uplink optical fiber pair 48D, 48U to provide the point-to-point communications. Whenever a remote unit 14 is installed in the DAS 12(1), the remote unit 14 is connected to a distinct downlink and uplink optical fiber pair 48D, 48U connected to the head-end equipment 16. Multiple downlink and uplink optical fiber pairs 48D, 48U can be provided in a fiber optic cable to service multiple remote units 14 from a common fiber optic cable. For example, with reference to FIG. 4, remote units 14 installed on a given floor 50, 52, or 54 may be serviced from the same optical fiber 48. In this regard, the optical fiber 48 may have multiple nodes where distinct downlink and uplink optical fiber pairs 48D, 48U can be connected to a given remote unit 14. One downlink optical fiber 48D could be provided to support multiple channels each using wavelength-division multiplexing (WDM), as discussed in U.S. patent application Ser. No. 12/892,424 filed Sep. 28, 2010, incorporated herein by reference in its entirety. Other options for WDM and frequency-division multiplexing (FDM) are also disclosed in U.S. patent application Ser. No. 12/892,424, any of which can be employed in any of the embodiments disclosed herein.

In the embodiment of the DAS 12(1) of FIG. 4, activity sensors 26 are distributed across each of the floors 50, 52, 54, as well as at one or more building entrances 72 on the first floor 50. As discussed above with respect to FIG. 2, the activity sensors 26 can be infrared sensors, door activity sensors, or other types of sensors that are capable of detecting the presence of one or more users in the coverage areas 10.

Figure 5:
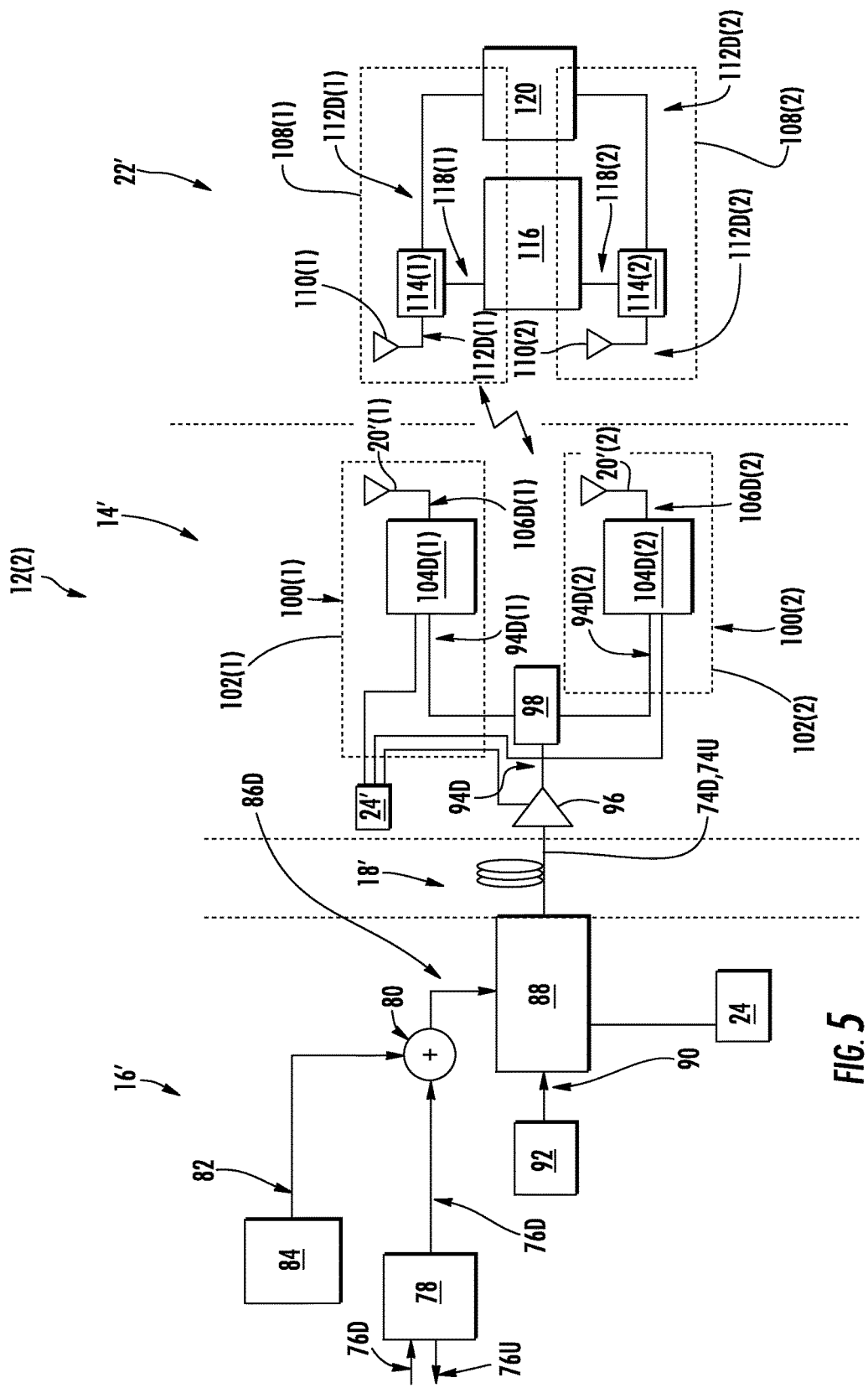
FIG. 5 is a schematic diagram of an exemplary multiple-in, multiple-out (MIMO) DAS configured to support MIMO communications services with client devices and manage power usage based on determined user activity.

The above described power management schemes can be adapted for use with a variety of distributed antenna systems, including systems that include MIMO communications services. MIMO technology involves the use of multiple antennas at both a transmitter and receiver to improve communications performance. In this regard, FIG. 5 is a schematic diagram of an exemplary optical fiber-based DAS 12(2) (referred to herein as "DAS 12(2)") configured to support MIMO communications services with wireless client devices 22'. Although the DAS 12(2) is configured to operate in MIMO configuration, various components, methods, and systems described herein with respect to the DAS 12(2) may be applied in whole or in part to other embodiments, including the adapted DAS 12(1) described above with respect to FIGS. 2-4. Referring back to FIG. 5, a head-end equipment 16' is provided that is configured to distribute downlink communications signals to one or more remote units 14'. FIG. 5 only illustrates one remote unit 14', but note that a plurality of remote units 14' is typically provided. The remote units 14' are configured to wirelessly communicate the downlink communications signals to one or more wireless client devices 22' (also referred to herein as "client devices 22'") that are in a communications range of the remote unit 14'. The remote unit 14' is also configured to receive uplink communications signals from the client devices 22' to be distributed to the head-end equipment 16'.

With continuing reference to FIG. 5, in this embodiment, an optical fiber communications medium 18' comprising at least one downlink optical fiber 74D and at least one uplink optical fiber 74U is provided to commutatively couple the head-end equipment 16' to the remote units 14'. The head-end equipment 16' is also configured to receive uplink communications signals from the remote units 14' via the optical fiber communications medium 18', although more specifically over the at least one uplink optical fiber 74U. The client device 22' in communication with the remote unit 14' can provide uplink communications signals to the remote unit 14', which are then distributed over the optical fiber communications medium 18' to the head-end equipment 16' to be provided to a network or other source, such as a base station for example.

The head-end equipment 16' is configured to receive electrical downlink MIMO communications signals 76D from outside the DAS 12(2) in a signal processor 78, and also provide electrical uplink MIMO communications signals 76U received from the client devices 22' to other systems. The signal processor 78 may be configured to provide the electrical downlink MIMO communications signals 76D to a mixer 80, which may be an IQ signal mixer in this example. The mixer 80 in this embodiment is configured to convert the electrical downlink MIMO communications signals 76D to IQ signals. The mixer 80 is driven by a frequency signal 82 that is provided by a local oscillator 84. In this embodiment, it is desired to up-convert the frequency of the electrical downlink MIMO communications signals 76D to provide higher-frequency electrical downlink MIMO communications signals 86D, to provide for a greater bandwidth capability before distributing the electrical downlink MIMO communications signals 86D to the remote units 14'. For example, the up-conversion carrier frequency may be provided as an extremely high frequency (e.g., approximately 30 GHz to 300 GHz).

With continuing reference to FIG. 5, because the mode of communication between the head-end equipment 16' and the remote unit 14' is provided by the optical fiber communications medium 18', the electrical downlink MIMO communications signals 86D are converted to optical signals by an electro-optical converter 88. The electro-optical converter 88 includes components to receive a light wave 90 from a light source 92, such as a laser. The light wave 90 is modulated by the frequency oscillations in the electrical downlink MIMO communications signals 86D to provide optical downlink MIMO communications signals 94D to be communicated over the downlink optical fiber 74D to the remote unit 14'. The electro-optical converter 88 may be provided so that the electrical downlink MIMO communications signals 86D are provided as Radio-over-Fiber (RoF) communications signals over the downlink optical fiber 74D.

The optical downlink MIMO communications signals 94D are received by an optical bi-directional amplifier 96, which are then provided to a MIMO splitter 98 in the remote unit 14'. The MIMO splitter 98 is provided so that the optical downlink MIMO communications signals 94D can be split among two separate downlink communications paths 100(1), 100(2) to be radiated over two separate MIMO antennas 20'(1), 20'(2) provided in two separate MIMO transmitters 102(1), 102(2) configured in MIMO configuration. The MIMO antennas 20'(1), 20'(2) are configured to be intra-cell bonded, meaning that both MIMO antennas 20'(1), 20'(2) within a given remote unit 14' are designed to be involved in communications with a particular client device 22' to provide MIMO communications with the particular client device 22'. The MIMO splitter 98 in the remote unit 14' is an optical splitter since the received optical downlink MIMO communications signals 94D are optical signals. In each downlink communications path 100(1), 100(2), downlink optical-to-electrical converters 104D(1), 104D(2) are provided to convert the optical downlink MIMO communications signals 94D to electrical downlink MIMO communications signals 106D(1), 106D(2).

With reference back to FIG. 5, the client device 22' includes two MIMO receivers 108(1), 108(2) that include MIMO receiver antennas 110(1), 110(2) also configured in MIMO configuration. The MIMO receiver antennas 110(1), 110(2) are configured to receive electrical downlink MIMO communications signals 112D(1), 112D(2) wirelessly from the remote unit 14'. Mixers 114(1), 114(2) are provided and coupled to the MIMO receiver antennas 110(1), 110(2) in the client device 22' to provide frequency conversion of the electrical downlink MIMO communications signals 112D(1), 112D(2). In this regard, a local oscillator 116 is provided that is configured to provide oscillation signals 118(1), 118(2) to the mixers 114(1), 114(2), respectively, for frequency conversion. In this embodiment, the electrical downlink MIMO communications signals 112D(1), 112D(2) are down converted back to their native frequency as received by the head-end equipment 16'. The down converted electrical downlink MIMO communications signals 112D(1), 112D(2) are then provided to a signal analyzer 120 in the client device 22' for any processing desired.

As discussed above with respect to FIG. 2, power can be reduced in the DAS 12(2) by reducing a total power output from the head-end equipment 16. In the embodiment of FIG. 5, this can be accomplished, for example, by reducing a power level of the light source 92 being delivered to the electro-optical converter 88. In the embodiment of FIG. 5, power can also be reduced at the remote unit 14', for example, by employing an energy management module 24' connected to the electro-optical converter 88, or an energy management module 24' connected to an optical bi-directional amplifier 96 and/or downlink optical-to-electrical converters 104D(1), 104D(2).

Each remote unit 14' may include multiple power amplifiers or other energy consuming circuits, for example for supporting MIMO communications, multiple frequency bands, and/or other wireless technologies. In this embodiment, individual MIMO radio paths (not shown) can be shut off completely, for example by turning off the associated downlink optical-to-electrical converter 104D, to conserve power. The remaining active MIMO radio paths can also be operated at a reduced power level.

Figure 6A:
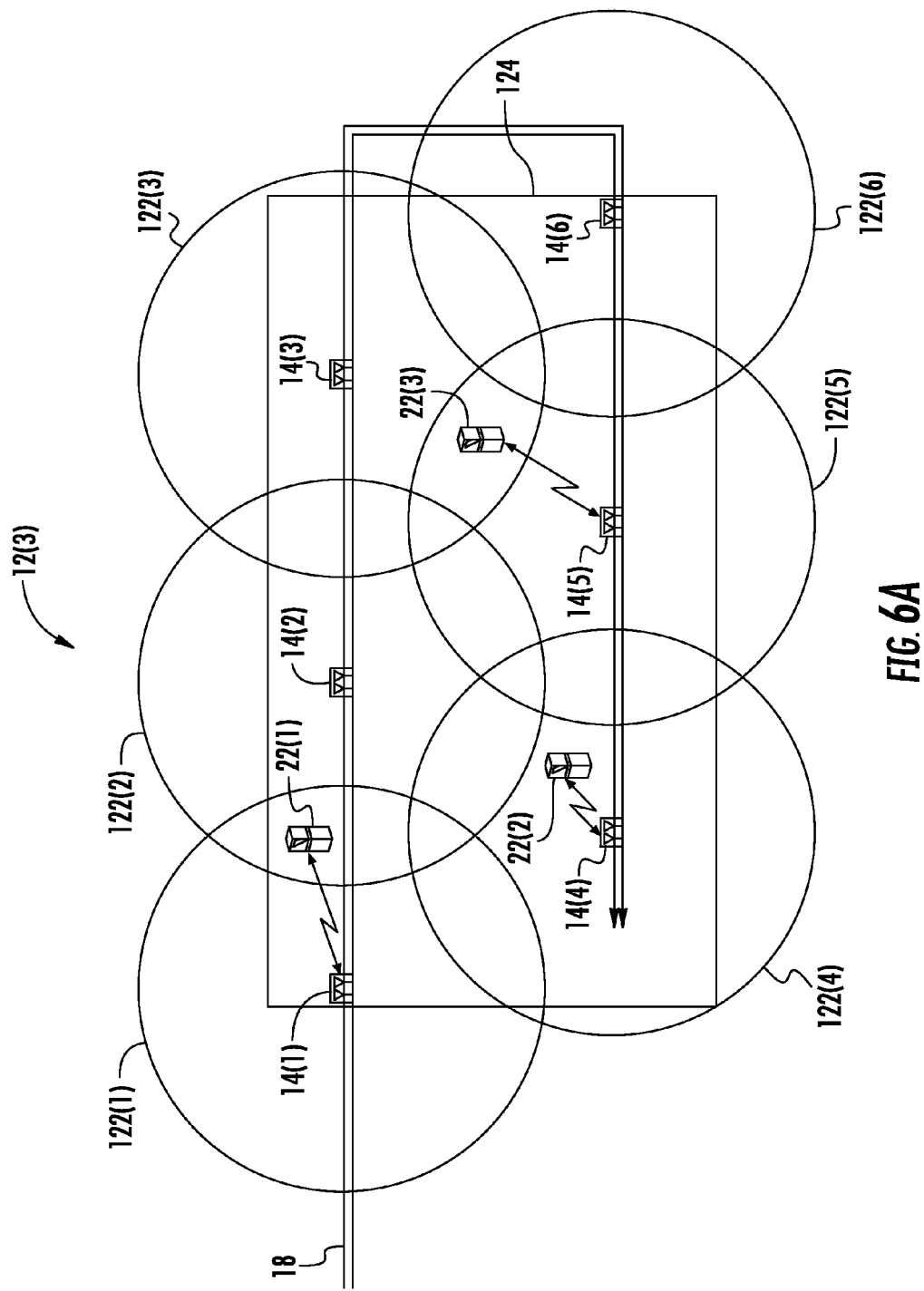
FIG. 6A is a schematic diagram of exemplary power management provided in a DAS adapted from the DAS of FIGS. 2-4.
Figure 6B:
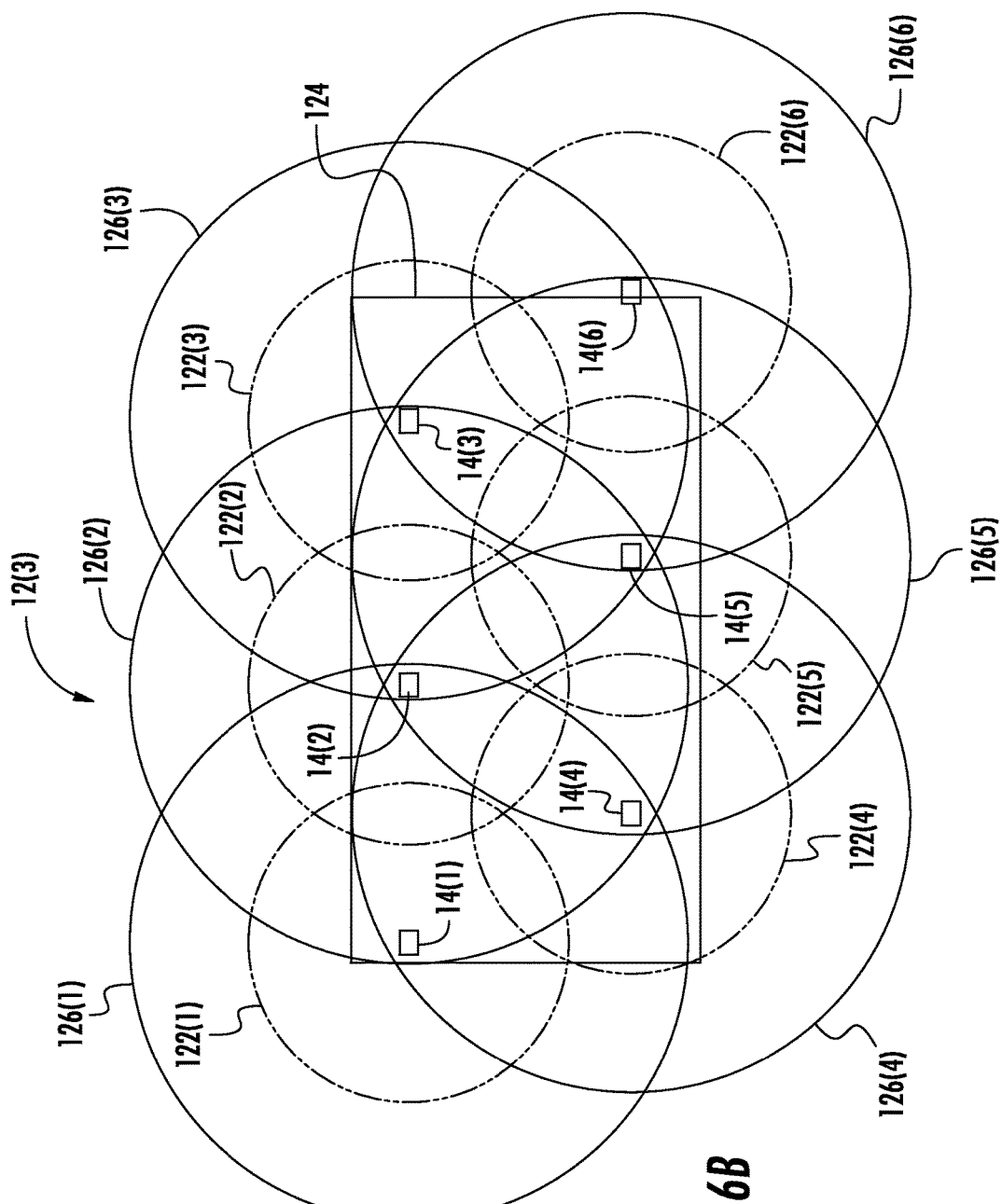
FIG. 6B is a schematic diagram of exemplary power management provided in a DAS adapted from the DAS of FIGS. 2-4.
Figure 6C:
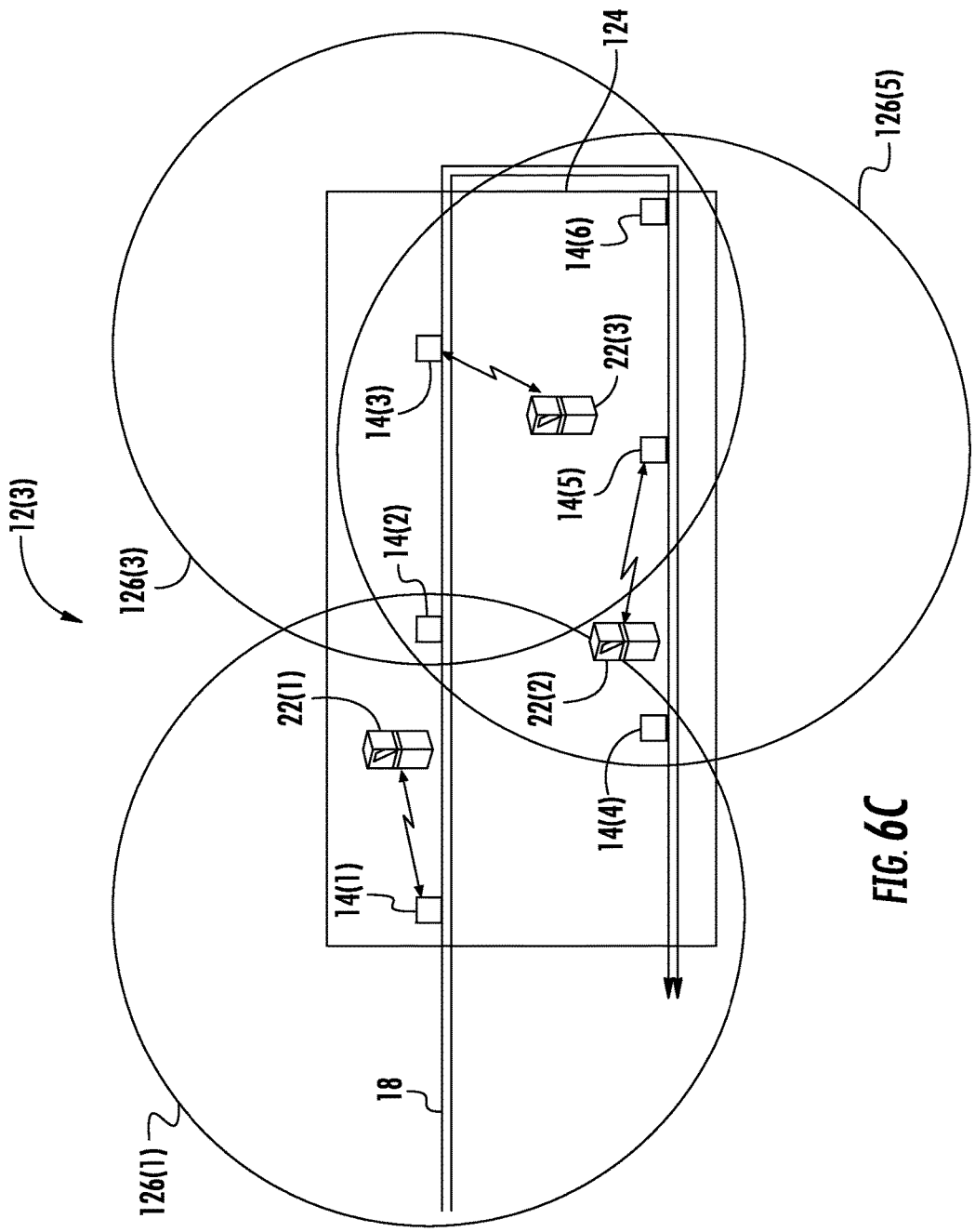
FIG. 6C is a schematic diagram of exemplary power management provided in a DAS adapted from the DAS of FIGS. 2-4.

When conserving power in this manner, it is desirable to maintain a minimum level of persistent coverage within the coverage area 10 of the DAS 12. FIGS. 6A-6C are schematic diagrams of exemplary power management provided in the adapted DAS 12(3), similar to DAS 12(1) of FIGS. 2-4. In this regard, FIG. 6A is a schematic diagram of exemplary power management provided in a DAS 12(3) that is adapted from the DAS 12(1) in FIGS. 2-4. Common components between the DAS 12(1) and the DAS 12(3) include common numbering in FIG. 6A, and will not be re-described in detail.

As illustrated in FIG. 6A, a plurality of remote units 14(1)-14(6) are provided in the DAS 12(3). Client devices 22(1)-22(3) are located in the DAS 12(3) and are configured to receive and transmit wireless communications signals with the DAS 12(3) via the remote units 14(1)-14(6). As discussed above, the range of each remote unit 14 can be dependent on a level of activity being experienced by each remote unit 14 and/or by the DAS 12(3). For example, the effective range of a remote unit 14 can decrease in high activity situations, and can increase in low activity situations. Thus, in order to ensure persistent coverage, the remote units 14(1)-14(6) may be arranged such that minimum ranges 122 of each remote unit 14 (i.e., the range of the remote unit 14 at maximum capacity) covers an entire desired coverage area 124. As illustrated in FIG. 6A, when the DAS 12(3) is at capacity, each remote unit 14 operates with a minimum range 122 such that all points in the entire desired coverage area 124 are still within range of at least one of the remote units 14(1)-14(6).

FIG. 6B illustrates the DAS 12(3) of FIG. 6A when operating at a lower activity level. In this embodiment, the range of each remote unit 14(1)-14(6) is significantly increased over the minimum ranges 122 in this low activity situation, and creates numerous redundant coverage areas 10 (not shown). Thus, it is possible to reduce the power provided to one or more of the remote units 14(1)-14(6) while still maintaining coverage over the entire desired coverage area 124.

In some embodiments, power can be reduced by proportionally reducing the power provided to all of the remote units 14(1)-14(6). Reducing power across the entire DAS 12(3) may reduce effective ranges 126 of the remote units 14(1)-14(6), such that they return to the minimum ranges 122 that correspond to full power operation of the DAS 12(3) at maximum capacity.

In some embodiments, the remote units 14(1)-14(6) of the DAS 12(3) can be arranged such that individual remote units 14 can be completely turned off in low activity situations without interrupting coverage in the desired coverage area 124. For example, FIG. 6C illustrates the DAS 12(3) of FIGS. 6A and 6B, in which the entire desired coverage area 124 is covered by the effective ranges 126 of remote units 14(1), 14(3), and 14(5) when operating at full power in low activity conditions. In this embodiment, individual remote units 14(2), 14(4), and 14(6) are turned off, while remote units 14(1), 14(3), and 14(5) remain on at full power. Thus, at the low activity level illustrated in FIG. 6C, coverage within the desired coverage area 124 is uninterrupted.

Although the DASs 12(1), 12(2) and 12(3) described above allow for distribution of RF communications signals, the DASs 12(1), 12(2) and 12(3) described above are not limited to distribution of RF communications signals. Data communications signals, including digital data signals, for distributing data services could also be distributed in the DASs 12(1), 12(2) and 12(3) in lieu of, or in addition to, RF communications signals. Also note that while the DAS 12(1) in FIGS. 2-4 described above includes distribution of communications signals over optical fibers 48, these DASs 12(1), 12(2) and 12(3) are not limited to distribution of communications signals over the optical fibers 48. Distribution media could also include, but are not limited to, coaxial cable, twisted-pair conductors, wireless transmission and reception, and/or any combination thereof. Also, any combination can be employed that also involves optical fibers 48 for portions of the DAS 12.

It may also be desired to provide high-speed wireless digital data service connectivity with the remote units in the DASs disclosed herein. An example of this connectivity is WiFi. WiFi was initially limited in data rate transfer to 12.24 megabits per second (Mb/s) but is now provided at data transfer rates of up to 54 Mb/s using WLAN frequencies of 2.4 gigahertz (GHz) and 5.8 GHz. While interesting for many applications, WiFi has proven to have too small a bandwidth to support real time downloading of uncompressed high definition (HD) television signals to wireless client devices. To increase data transfer rates, the frequency of wireless signals could be increased to provide larger channel bandwidth. For example, an extremely high frequency in the range of 30 GHz to 300 GHz could be employed. For example, the sixty (60) GHz spectrum is an extremely high frequency (EHF) that is an unlicensed spectrum by the Federal Communications Commission (FCC) and that could be employed to provide for larger channel bandwidths. However, high frequency wireless signals are more easily attenuated from traveling through walls or other building structures where DASs are installed.

Thus, the embodiments disclosed herein can include distribution of EHF (i.e., approximately 30-approximately 300 GHz). The DASs disclosed herein can also support provision of digital data services to wireless clients. The use of the EHF band allows for the use of channels having a higher bandwidth, which in turn allows more data intensive signals, such as uncompressed HD video to be communicated without substantial degradation to the quality of the video. As a non-limiting example, the DASs disclosed herein may operate at approximately sixty (60) GHz with approximately seven (7) GHz bandwidth channels to provide greater bandwidth to digital data services. The distributed antenna systems disclosed herein may be well suited to be deployed in an indoor building or other facility for delivering digital data services.

It may be desirable to provide DASs that provide digital data services for client devices. For example, it may be desirable to provide digital data services to client devices located within a DAS. Wired and wireless devices may be located in infrastructures that are configured to access digital data services. Examples of digital data services include, but are not limited to, Ethernet, WLAN, WiMax, WiFi, Digitial Subscriber Line (DSL), and Long Term Evolution (LTE), etc. Ethernet standards could be supported, including but not limited to, 100 Mb/s (i.e., fast Ethernet) or Gigabit (Gb) Ethernet, or ten Gigabit (10G) Ethernet. Examples of digital data services include wired and wireless servers, wireless access points (WAPs), gateways, desktop computers, hubs, switches, remote radio heads (RRHs), baseband units (BBUs), and femtocells. A separate digital data services network can be provided to provide digital data services to digital client devices.

Figure 7:
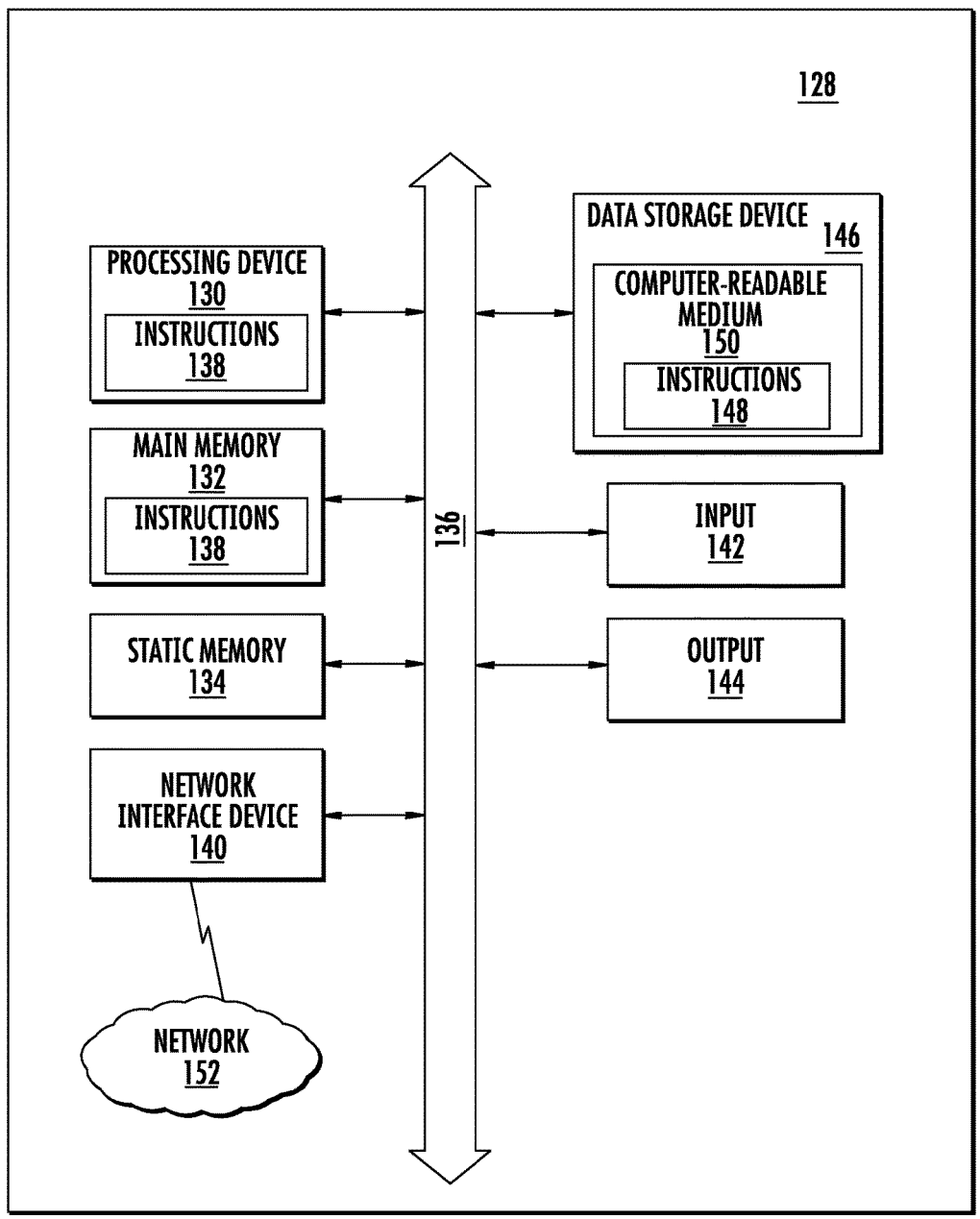
FIG. 7 is a schematic diagram of a generalized representation of an exemplary controller that can be included in any central unit, remote units, wireless client devices, and/or any other components of a DAS to provide or support power management, wherein a computer system is adapted to execute instructions from a computer-readable medium.

FIG. 7 is a schematic diagram representation illustrating components with additional detail that could be employed in any of the DASs, components or devices disclosed herein, if adapted to execute instructions from an exemplary computer-readable medium to perform any of the functions or processing described herein. For example, these components may be integrated into or be configured to otherwise instruct the energy management module 24 of FIGS. 2-4 to carry out one or more of the power management schemes described above. For example, the processes described in FIGS. 3A-3C above could be provided as a result of executing instructions from a computer-readable medium. In this regard, such a component or device may include a computer system 128, within which a set of instructions for performing any one or more of the power management schemes discussed herein may be executed. The computer system 128 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 128 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 128 in this embodiment includes a processing device or processor 130, a main memory 132 (e.g., read-only memory (ROM), flash memory, dynamic random access memory (DRAM), such as synchronous DRAM (SDRAM), etc.), and a static memory 134 (e.g., flash memory, static random access memory (SRAM), etc.), which may communicate with each other via a data bus 136. Alternatively, the processing device 130 may be connected to the main memory 132 and/or static memory 134 directly or via some other connectivity means. The processing device 130 may be a controller, and the main memory 132 or static memory 134 may be any type of memory.

The processing device 130 represents one or more general-purpose processing devices, such as a microprocessor, central processing unit, or the like. More particularly, the processing device 130 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets, configured to execute processing logic in instructions 138 for performing the operations discussed herein.

The computer system 128 may further include a network interface device 140. The computer system 128 also may include an input 142, configured to receive input and selections to be communicated to the computer system 128 when executing the instructions 138. The computer system 128 also may include an output 144, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 128 may include a data storage device 146 that includes instructions 148 stored in a computer-readable medium 150. The instructions 148 may also reside, completely or at least partially, within the main memory 132 and/or within the processing device 130 during execution thereof by the computer system 128, wherein the main memory 132 and the processing device 130 also constitute the computer-readable medium 150. The instructions 148 may further be transmitted or received over a network 152 via the network interface device 140.

While the computer-readable medium 150 is shown as a single medium, the term "computer-readable medium" includes a single medium or multiple media (e.g., a centralized or distributed database, and/or associated caches and servers) that store the instructions 148. The term "computer-readable medium" shall also include any medium that is capable of storing, encoding, or carrying a set of instructions for execution by the processing device and that causes the processing device to perform any one or more of the methodologies disclosed herein. The term "computer-readable medium" shall accordingly be taken to include, but not be limited to, solid-state memories, optical and magnetic medium, and carrier wave signals.

The embodiments disclosed herein include various steps that may be formed by hardware components or embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine, such as: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.); and the like.

Unless specifically stated otherwise and as apparent from the previous discussion, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus, or programming language.

The various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the DASs described herein may be employed in any circuit, hardware component, integrated circuit (IC), or IC chip, as examples. Memory disclosed herein may be any type of memory and may be configured to store any type of information desired. To illustrate this interchangeability, illustrative components, blocks, modules, circuits, and steps have been described above generally in terms of their functionality.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other known form of computer-readable medium. An exemplary storage medium is coupled to the processor such that the processor can read information from, and write information to, the storage medium. Alternatively, the storage medium may be integral to the processor. The processor and the storage medium may reside in an ASIC, which may reside in a remote station. Alternatively, the processor and the storage medium may reside as discrete components in a remote station, base station, or server.

The operational steps described in any of the exemplary embodiments herein may be performed in numerous different sequences other than the illustrated sequences. Furthermore, operations described in a single operational step may actually be performed in a number of different steps, and one or more operational steps may be combined. Information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

As used herein, the terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, or jackets.

Many modifications and other embodiments of the embodiments set forth herein will come to mind to one skilled in the art to which the embodiments pertain, and having the benefit of the teachings presented in the forgoing descriptions and the associated drawings. Therefore, it is to be understood that the description and claims are not to be limited to the specific embodiments disclosed, and that modifications and other embodiments are intended to be included within the scope of the appended claims. The embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wireless communications system, comprising:
    a plurality of remote units;
    a head-end unit coupled to the remote unit over a plurality of optical communications paths, the head-end unit including a controller configured to:
        monitor a plurality of remote units in a first power configuration, wherein
            at least one remote unit of the plurality of remote units in the first power configuration has a first power state such that the remote unit has a first coverage range when the remote unit has a user activity level at a first predetermined threshold, and the remote unit has a second coverage range larger than the first coverage range when the remote unit has a user activity level at a second predetermined threshold below the first predetermined threshold, and
            the first coverage ranges of the plurality of remote units cover all of a predetermined coverage area;
        determine that each remote unit of a first subset of the plurality of remote units has a user activity level below the second predetermined threshold;
        in response to the determination that each remote unit of the first subset has a user activity level below the second predetermined threshold, determine a second power configuration wherein each remote unit of a second subset of the plurality of remote units has a second power state lower than the first power state of the respective remote unit, such that each remote unit of the second subset has a third coverage range smaller than the second coverage range of the respective remote unit, wherein the third coverage ranges of the remote units of the second subset and the first coverage ranges of the remote units outside the second subset cover all of the predetermined coverage area; and
        reduce power usage to each remote unit of the second subset of the plurality of remote units from the first power state to the second power state of the respective remote unit such that the plurality of remote units are in the second power configuration.

2. The wireless communications system of claim 1, wherein the remote units are distributed among at least two floors of a building infrastructure, and wherein the plurality of optical communications paths includes a plurality of optical fibers comprising part of a cable deployed in the building infrastructure.

3. The wireless communications system of claim 2, wherein the optical communications paths are configured to convey one or more signals selected from the group consisting of: cellular service, radio frequency identification (RFID) tracking, wireless fidelity (WiFi), local area network (LAN), and wireless local area network (WLAN).

4. The wireless communications system of claim 2, comprising at least one interconnect unit located on at least one of the floors and comprising at least a part of the optical communication paths.

5. The wireless communications system of claim 4, wherein the interconnect unit comprises a power supply configured to provide electrical power to at least one of the remote units.

6. The wireless communications system of claim 2, wherein the head-end is configured to receive wireless RF communications signals from a source and convert the RF communications signals into Radio-over-Fiber (RoF) signals to be communicated over the optical communication paths.

7. The wireless communications system of claim 1, wherein the second power state of each remote unit of the second subset of the plurality of remote units is higher than a third power state of the respective remote unit.

8. The wireless communications system of claim 7, wherein the third power state is an off state.

9. The wireless communications system of claim 8, wherein the controller is further configured to:
    determine that a third subset of the plurality of remote units of the DAS has a user activity level above a third predetermined threshold; and
    in response to the determination that the third subset of the plurality of remote units has a user activity level above the third predetermined threshold, increase power to each remote unit of a fourth subset of the plurality of remote units.

10. The wireless communications system of claim 8, wherein:

each remote unit of the plurality of remote units includes a plurality of multiple-in, multiple-out (MIMO) front ends; and reducing power to each remote unit of the second subset of the plurality of remote units comprises turning off at least one MIMO front end of the plurality of MIMO front ends for each remote unit of the second subset of the plurality of remote units.

11. The wireless communications system of claim 7, wherein the remote units are distributed among at least two floors of a building infrastructure, and wherein the plurality of optical communications paths includes a plurality of optical fibers comprising part of a cable deployed in the building infrastructure.

12. The wireless communications system of claim 11, wherein the optical communications paths are configured to convey one or more signals selected from the group consisting of: cellular service, radio frequency identification (RFID) tracking, wireless fidelity (WiFi), local area network (LAN), and wireless local area network (WLAN).

13. The wireless communications system of claim 11, comprising at least one interconnect unit located on at least one of the floors and comprising at least a part of the optical communication paths, wherein the interconnect unit comprises a power supply configured to provide electrical power to at least one of the remote units.

14. The wireless communications system of claim 11, wherein the head-end is configured to receive wireless RF communications signals from a source and convert the RF communications signals into Radio-over-Fiber (RoF) signals to be communicated over the optical communication paths.

15. The wireless communications system of claim 1, wherein:

each remote unit of the plurality of remote units includes a plurality of multiple-in, multiple-out (MIMO) front ends; and reducing power to each remote unit of the second subset of the plurality of remote units comprises turning off at least one MIMO front end of the plurality of MIMO front ends for each remote unit of the second subset of the plurality of remote units.

16. The wireless communications system of claim 15, wherein the remote units are distributed among at least two floors of a building infrastructure, and wherein the plurality of optical communications paths includes a plurality of optical fibers comprising part of a cable deployed in the building infrastructure.

17. The wireless communications system of claim 16, wherein the head-end is configured to receive wireless RF communications signals from a source and convert the RF communications signals into Radio-over-Fiber (RoF) signals to be communicated over the optical communication paths.

* * * * *